(12) United States Patent
Hatta

(10) Patent No.: US 8,419,319 B2
(45) Date of Patent: Apr. 16, 2013

(54) CUTTING INSERT, CUTTING TOOL USING THE SAME, AND CUTTING METHOD

(75) Inventor: Kaoru Hatta, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 739 days.

(21) Appl. No.: 12/443,434

(22) PCT Filed: Sep. 28, 2007

(86) PCT No.: PCT/JP2007/069108
§ 371 (c)(1),
(2), (4) Date: Mar. 27, 2009

(87) PCT Pub. No.: WO2008/038804
PCT Pub. Date: Apr. 3, 2008

(65) Prior Publication Data
US 2010/0247252 A1   Sep. 30, 2010

(30) Foreign Application Priority Data

Sep. 29, 2006   (JP) .................................. 2006-268837

(51) Int. Cl.
*B23C 5/02* (2006.01)
*B23C 5/16* (2006.01)
*B23C 5/26* (2006.01)

(52) U.S. Cl.
USPC .......................................... 407/113; 407/114

(58) Field of Classification Search ............... 407/113, 407/58, 59, 60, 61, 62, 63, 114
See application file for complete search history.

(56) References Cited

U.S. PATENT DOCUMENTS

| 3,636,602 | A | * | 1/1972 | Owen | 407/113 |
| 4,180,355 | A | * | 12/1979 | Nanini | 407/113 |
| 4,248,553 | A | * | 2/1981 | Kraemer | 407/114 |
| 5,221,164 | A | * | 6/1993 | Allaire | 407/113 |
| 5,791,832 | A | * | 8/1998 | Yamayose | 407/113 |
| 5,810,519 | A | * | 9/1998 | Vogel et al. | 407/114 |
| 6,619,891 | B2 | * | 9/2003 | Hansson et al. | 407/35 |
| 6,862,966 | B2 | * | 3/2005 | Knapp | 82/1.11 |

(Continued)

FOREIGN PATENT DOCUMENTS

| CN | 1597206 A | 3/2005 |
| EP | 392729 A2 * | 10/1990 |

(Continued)

OTHER PUBLICATIONS

Chinese language office action dated Apr. 13, 2010 and its English language translation for corresponding Chinese application 200780036282.9 lists the references above.

*Primary Examiner* — Kenneth E. Peterson
*Assistant Examiner* — Jennifer Swinney
(74) *Attorney, Agent, or Firm* — DLA Piper LLP (US)

(57) ABSTRACT

A cutting edge is formed at a ridge between an upper surface and a side surface. In the side surface, a plurality of grooves are formed so as to extend from the side surface to the upper surface to divide the cutting edge, and the clearance angles within these grooves are formed so as to increase from one end of the cutting edge toward the other end of the cutting edge. This achieves a cutting insert having small cutting force and excellent cutting performance. Among the plurality of grooves, the groove nearest to the one end of the cutting edge has preferably a width increasing from the upper surface of the cutting insert toward the lower surface.

16 Claims, 9 Drawing Sheets

U.S. PATENT DOCUMENTS

| | | | |
|---|---|---|---|
| 7,040,844 B1 * | 5/2006 | Daiguji | 407/113 |
| 7,802,946 B2 * | 9/2010 | Ishida | 407/113 |
| 2008/0260476 A1 | 10/2008 | Ishida | |

FOREIGN PATENT DOCUMENTS

| | | | |
|---|---|---|---|
| GB | 2054427 A * | 2/1981 | |
| JP | 59196107 A | 11/1984 | |
| JP | 09057519 A | 3/1997 | |
| JP | 09117817 A | 5/1997 | |
| JP | 2006088284 A | 4/2004 | |
| JP | 2004148424 A | 5/2004 | |
| JP | 2006218617 A * | 8/2006 | |
| WO | 2006035910 A1 | 4/2006 | |
| WO | WO 2006035910 A1 * | 4/2006 | |

* cited by examiner (a)

(b)

(c)

(a)

(b)

CUTTING INSERT, CUTTING TOOL USING THE SAME, AND CUTTING METHOD

CROSS-REFERENCE TO THE RELATED APPLICATIONS

This application is a national stage of international application No. PCT/JP2007/069108 filed Sep. 28, 2007, which also claims the benefit of priority under 35 USC 119 to Japanese Patent Application No. 2006-268837 filed Sep. 29, 2006, the entire contents of which are incorporated herein by reference.

TECHNICAL FIELD

The present invention relates to a cutting insert mounted on a cutting tool used for cutting of materials such as metal materials, and a cutting tool using the cutting insert, as well as a cutting method.

BACKGROUND ART

Examples of the cutting tool generally used for cutting metal materials and the like include those that a cutting insert having a cutting edge is mounted thereon. For example, Patent Document 1 describes a predetermined cutting insert, and a cutting tool with the cutting insert mounted thereon (specifically, an end mill).

FIG. 12(*a*) is a side view showing the related art cutting tool as described in Patent Document 1. FIG. 12(*b*) is an enlarged side view showing the related art cutting insert mounted on the cutting tool of FIG. 12(*a*). As shown in FIG. 12(*a*), a cutting tool 100 as being the end mill is constructed of a cutting insert 101 having a cutting edge, and a holder 111 having at the tip end thereof a cutting insert pocket 110 for mounting the cutting insert 101. The cutting using the cutting insert 101 is carried out by rotating the holder 111 around an axis 112 of the holder 111.

As shown in FIG. 12(*b*), the cutting insert 101 has a cutting edge at the ridge between an upper surface 102 and a side surface 103. The cutting edge is provided with a high-positioned corner cutting edge 104, and a low-positioned corner portion 106, which is lower in the thickness direction of the cutting insert 101 than the high-positioned corner cutting edge 104.

However, there is the problem that the cutting insert 101 thus constructed is subjected to large cutting force during cutting, and has low cutting performance. Patent Document 1: Japanese Unexamined Patent Publication No. 2004-148424

DISCLOSURE OF THE INVENTION

Problems to be Solved by the Invention

An advantage of the invention is to provide a cutting insert and a cutting tool using the cutting insert as well as a cutting method, which are subjected to small cutting force and have excellent cutting performance.

Means for Solving the Problems

In order to solve the above problem, the present inventor carried out intensive research to find the solution composed of the following configuration, thereby completing the present invention.

Specifically, a cutting insert of the invention comprise a cutting edge formed at a ridge between an upper surface and a side surface. The side surface has a plurality of grooves extending from the side surface to the upper surface to divide the cutting edge. Clearance angles within the grooves increase from one end of the cutting edge toward the other end of the cutting edge.

Other cutting insert of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. A plurality of grooves extends from the side surface to the upper surface to divide the cutting edge by the grooves. In the plurality of grooves, the clearance angle within the groove nearest to the low-positioned portion is greater than the clearance angle within the groove nearest to the high-positioned portion.

A still other cutting insert of the invention comprises an insert main body having an upper surface and a plurality of side surfaces, a cutting edge located between both ends of a ridge which is between at least one side surface among the side surfaces and the upper surface, a high-positioned portion located at one end of the ridge, and a low-positioned portion located lower in a thickness direction of the insert main body than the high-positioned portion and located at the other end of the ridge. The cutting edge comprises a first flat cutting edge having substantially the same height as the high-positioned portion, a second flat cutting edge having substantially the same height as the low-positioned portion, and a tilted cutting edge having a height decreasing from the high-positioned portion toward the low-positioned portion and located between the first flat cutting edge and the second flat cutting edge. A plurality of grooves extends from the side surface to the upper surface to divide the cutting edge by the grooves. The side surface comprises a first flank connecting to the first flat cutting edge, a second flank connecting to the tilted cutting edge, and a third flank connecting to the second flat cutting edge. "a", "b" and "c" satisfy the relationship of a<b<c, wherein "a" represents the clearance angle within the groove formed at the first flank, "b" represents the clearance angle within the groove formed at the second flank, and "c" represents the clearance angle within the groove formed at the third flank.

Effect of the Invention

According to the embodiment of the present invention, the plurality of grooves extends from the side surface to the upper surface to divide the cutting edge. Therefore, when cutting is carried out by using the cutting insert comprising these grooves, the portions of a work material corresponding to the grooves are not cut, and cutting force can be decreased by the amount of the uncut portions.

Additionally, in the cutting insert according to the embodiment of the invention, the clearance angles within these grooves increase from one end of the cutting edge toward the other end of the cutting edge. In other cutting insert according to the embodiment of the invention, in the plurality of grooves, the clearance angle within the groove nearest to the low-positioned portion is greater than the clearance angle within the groove nearest to the high-positioned portion. In the still other cutting insert according to the embodiment of the invention, the side surface comprises the first flank connecting to the first flat cutting edge, the second flank connecting to the tilted cutting edge, and the third flank connecting to the second flat cutting edge. "a", "b" and "c" satisfy the relationship of a<b<c, wherein "a" represents the clearance angle within the groove formed at the first flank, "b" represents the clearance angle within the groove formed at the second flank, and "c" represents the clearance angle within the groove formed at the third flank.

Even in any one of these cutting inserts, the clearance angles within these grooves are configured as above. It is therefore capable of reducing the occurrence of vibration due to the uncut portions of the work material interfering with the grooves during cutting, while reducing the strength deterioration due to the thickness decrease in the one end of the cutting edge used for cutting all the times and in the vicinity of the high-positioned portion.

That is, in the cutting tools such as (throw away) end mills to which an axial rake angle is imparted, the radial rake angle changes time after time over the entire region of the cutting edge. Particularly, when the cutting edge locates over the entire region of the ridge, and the cutting insert is mounted at a position where its radial rake angle covers a positive angle and a negative angle, the clearance angle of the portion of the cutting edge, in which the radial rake angle added to the cutting insert itself is a positive angle, is required to be formed greater than the clearance angle of the portion of the cutting edge, in which the radial rake angle added to the cutting insert itself is a negative radial rake angle. If the clearance angles within the plurality of grooves formed in the side surface are the same, the uncut portions of the work material interfere with the grooves during cutting, thereby causing vibration. The occurrence of the vibration leads to a chipping, and deterioration in cutting properties.

According to the embodiment of the cutting inserts of the invention, these cutting inserts are mounted on a tool holder so that an axial rake angle increases in a direction away from the tip end of the tool holder. When among the plurality of grooves of the cutting insert, the groove near to the tip end of the tool holder is represented by a first groove (the negative radial rake angle side), and the groove near to the rear end than the first groove is represented by a second groove (the positive radial rake angle side), the clearance angle within the second groove is greater than the clearance angle within the first groove. This enables the above-mentioned interference to be reduced. It is therefore capable of decreasing cutting force while reducing the occurrence of vibration due to the uncut portions of the work material interfering with the grooves, thereby having excellent cutting performance.

According to other cutting insert according to the embodiment of the invention, among the plurality of grooves, the clearance angle within the groove nearest to the low-positioned portion (the positive radial rake angle side) is greater than the clearance angle within the groove nearest to the high-positioned portion (the negative radial rake angle side), thus enabling the above-mentioned interference to be reduced. It is therefore capable of decreasing cutting force while reducing the occurrence of vibration due to the uncut portions of the work material interfering with the grooves, thereby having excellent cutting performance.

Also in the still other cutting insert according to the embodiment of the invention, the clearance angles a, b and c within the respective grooves satisfy the relationship of a<b<c. It is therefore capable of reducing the occurrence of vibration due to the uncut portions of the work material interfering with the grooves during cutting. Hence, it is capable of decreasing cutting force while reducing the occurrence of vibration due to the uncut portions of the work material interfering with the grooves, thereby having excellent cutting performance.

Especially, in the still other cutting insert according to the embodiment of the invention, the cutting edge comprises the first flat cutting edge having substantially the same height as the high-positioned portion, thus enabling retention of the strength of the high-positioned portion used for cutting all the times. Additionally, the cutting edge comprises also the second flat cutting edge having substantially the same height as the low-positioned portion, thus enabling a further improvement of cutting properties.

Furthermore, the above cutting edge comprises the tilted cutting edge having a height decreasing from the high-positioned portion toward the low-positioned portion. This enables the cutting insert itself to have an axial rake angle, so that cutting properties can be improved to decrease cutting force without reducing the thickness of the tool holder to ensure a large axial rake angle when the cutting insert is mounted on the tool holder. Additionally, for the above reason, the axial rake angle added to the tool folder itself when the cutting insert is mounted on the tool holder can be minimized, so that the thickness of the tool holder underlying the bottom surface of the cutting insert can be ensured to retain the rigidity of the tool holder.

PREFERRED EMBODIMENTS FOR CARRYING OUT THE INVENTION

<Cutting Insert>

A preferred embodiment of the cutting insert according to the invention is described in detail with reference to the accompanying drawings.

Figure 1:
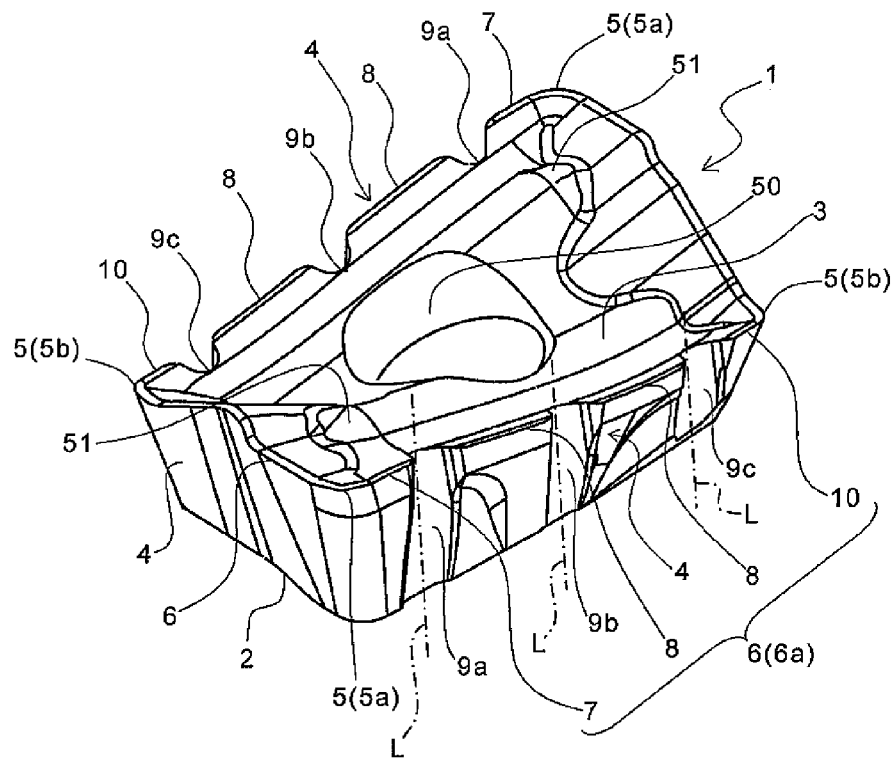
FIG. 1 is a perspective view showing a cutting insert according to a preferred embodiment of the invention.
Figure 2:
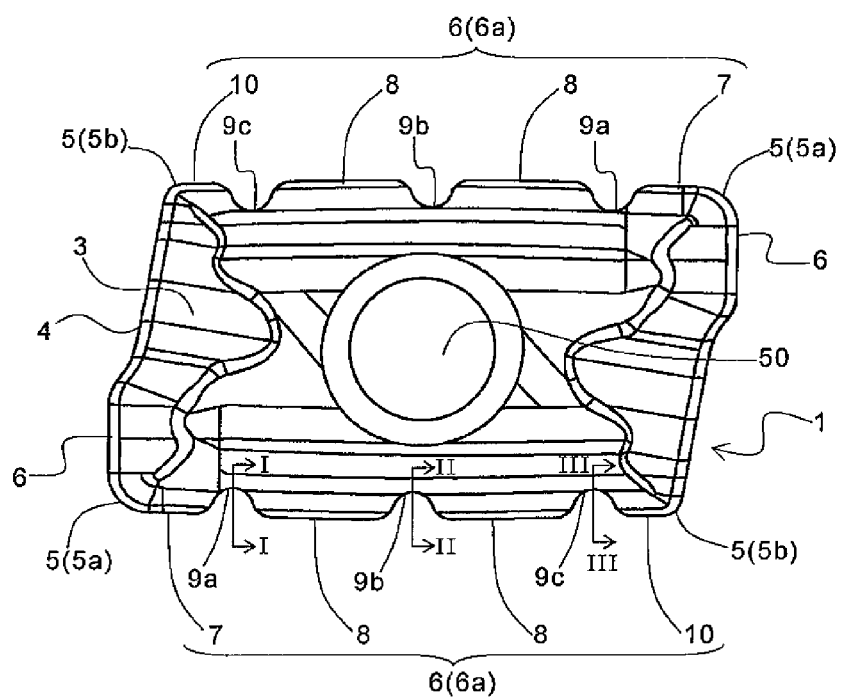
FIG. 2 is a plan view showing the cutting insert according to the preferred embodiment of the invention.
Figure 3:
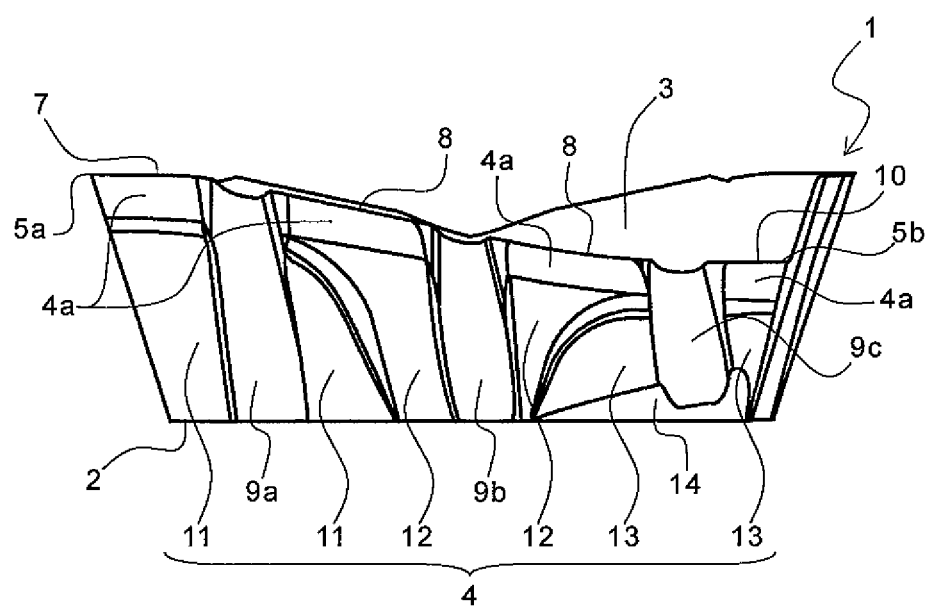
FIG. 3 is a side view showing the cutting insert according to the preferred embodiment of the invention.

As shown in FIGS. 1 to 3, the cutting insert according to the preferred embodiment (hereinafter referred to simply as an insert) 1 comprises an insert main body having substantially a parallelogram when viewed from above. The insert 1 comprises a bottom surface 2 serving as a seat surface, an upper surface 3 having a rake face, and a side surface 4 having a flank. The insert 1 comprises further corner portions 5 (5a and 5b) located at the corner parts of the insert main body in a ridge between the upper surface 3 and the side surface 4, and a cutting edge 6 located between these two corner portions 5 and 5 in the ridge (namely between both ends of the ridge) and connected to these two corner portions 5 and 5.

The rake face of the upper surface 3 means the face of the upper surface 3, through which generated chips graze. A through-hole 50 extending through the bottom surface 2 is formed centrally of the upper surface 3. The through-hole 50 is for fixing the insert 1 to a tool holder (hereinafter referred to simply as a holder) 60 shown in FIG. 8 and FIG. 9 described later. The insert 1 has a 180-degree rotationally symmetrical shape with respect to the central axis of the through-hole 50. This is convenient because when one of the cutting edges in use is worn, the insert 1 can be rotated 180 degrees to use the other cutting edge not yet used.

A chip breaker (refer to FIG. 1) is formed at the upper surface 3 along the longitudinal direction so as to have a protuberance 51, which is lowered and thereafter raised as it extends from a later described high-positioned corner cutting edge 5a and the cutting edge 6 toward the center of the upper surface 3. Owing to this, chips can be curled or divided, enabling smooth discharge of the chips to be generated.

The corner portion 5 comprises two high-positioned corner cutting edges 5a and 5a (the high-positioned portions) located on one diagonal, and two low-positioned corner portions 5b and 5b (the low-positioned portions), which are located lower than the high-positioned corner cutting edges 5a in the thickness direction of the insert main body and located on the other diagonal. The high-positioned corner cutting edges 5a are cutting edges used for cutting all the times. Preferably, the radius of curvature thereof is usually about 0.4 to 6.4 mm in terms of the balance between the strength of the cutting edge and machined shape.

In the cutting edge 6, the main cutting edge 6a located in the longitudinal direction of the insert 1 comprises a first flat cutting edge 7 having substantially the same height as the high-positioned corner cutting edge 5a. The first flat cutting edge 7 is for retaining the strength of the high-positioned corner cutting edges 5a used for cutting all the times, and needs strength because the first flat cutting edge 7 comes in first contact with a work material in the cutting edge during cutting. Therefore, the first flat cutting edge 7 is formed at substantially the same height as the high-positioned corner cutting edges 5a, in order to achieve compatibility between the strength and retention of the cutting edge angle.

The main cutting edge 6a comprises a second flat cutting edge 10 having substantially the same height as the low-positioned corner portion 5b. This further improves cutting properties. Further, the strength deterioration of the insert 1 due to the thickness decrease at the rear end portion of the main cutting edge 6a can also be reduced to ensure the clamping area of the side surface 4 with respect to the holder 60.

The main cutting edge 6a comprises a tilted cutting edge 8 located between the first flat cutting edge 7 and the second flat cutting edge 10, and the height of the tilted cutting edge 8 gradually decreases from the high-positioned corner cutting edge 5a toward the low-positioned corner portion 5b. This enables the insert 1 itself to have an axial rake angle, so that cutting properties can be improved and cutting force can be decreased without decreasing the thickness of the holder 60 to ensure a large axial rake angle. Additionally, for the above reason, the axial rake angle added to the tool folder itself when the insert 1 is mounted on the holder 60 can be minimized, so that the thickness of the holder 60 underlying the bottom surface 2 of the insert 1 can be ensured to retain the rigidity of the holder 60.

Figure 5:
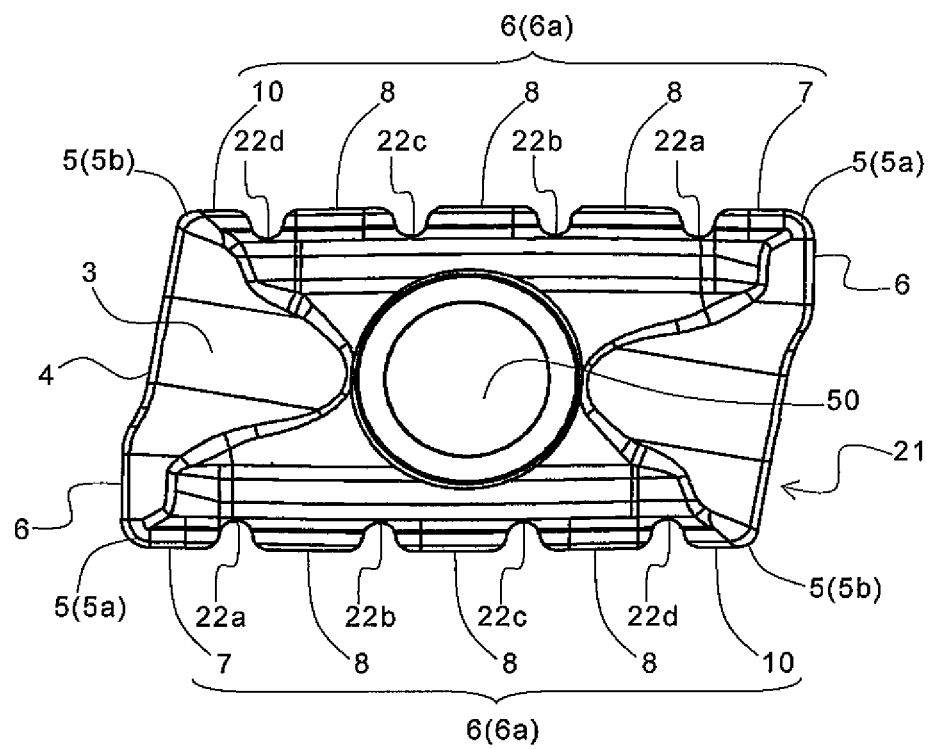
FIG. 5 is a plan view showing a cutting insert according to other preferred embodiment of the invention.
Figure 6:
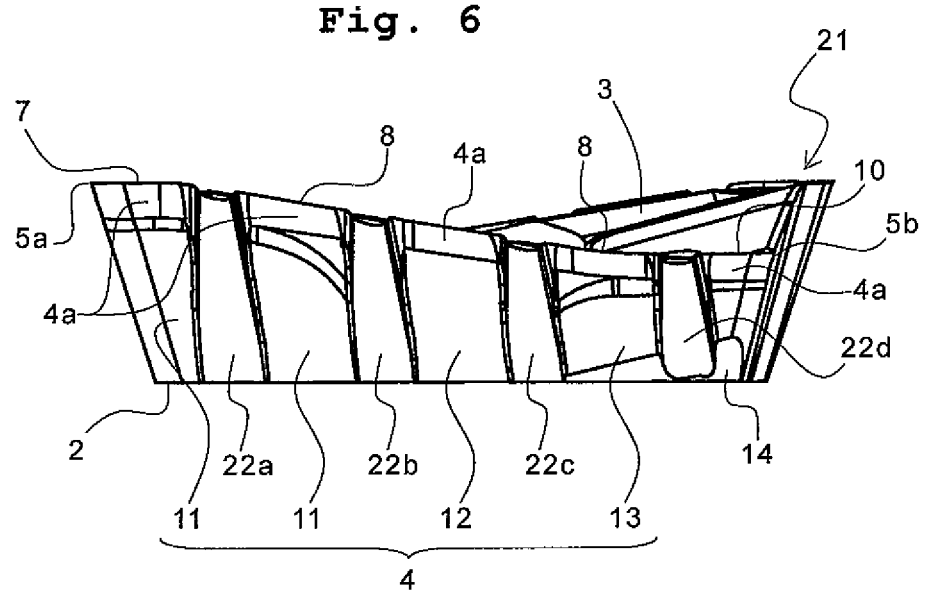
FIG. 6 is a side view showing the cutting insert according to the above other preferred embodiment of the invention.

The side surface 4 in each longitudinal direction of the insert 1 has grooves 9a, 9b and 9c as a plurality of grooves (nicks) extending from the side surface 4 to the upper surface 3 to divide the cutting edge 6a. These enable a decreased cutting force during cutting. That is, when the insert 1 is used for cutting, the work material located at the positions corresponding to these grooves 9a, 9b and 9c are not cut, so that the cutting force can be decreased by the amount of these uncut portions. These uncut portions may be subjected to cutting by, for example, adjusting the mounting position of the insert 1 in the holder 60 to be described later, or by using the insert 1 in combination with an insert 21 comprising four grooves as shown in FIG. 5 and FIG. 6.

The grooves 9a, 9b and 9c have their respective widths gradually increasing from the upper surface 3 toward the lower surface 2. This enables reduction in the strength deterioration due to the decreased thickness of the the insert main body, and retention of the strength of the main cutting edge 6a. By arranging so that at least the groove 9a nearest to the high-positioned corner portion 5a has the above configuration, it is capable of retaining the strength of the high-positioned corner cutting edge 5a used for cutting all the times.

In the grooves 9a, 9b and 9c, the clearance angle within the groove 9c nearest to the low-positioned corner cutting edge 5b is greater than the clearance angle within the groove 9a nearest to the high-positioned corner cutting edge 5a (refer to FIGS. 4(a) and 4(c)). This enables reduction in the strength deterioration of the insert main body due to the thickness decrease of the insert main body in the vicinity of the high-positioned corner cutting edge 5a used for cutting all the times, thereby retaining the strength of the high-positioned corner cutting edge 5a. This further reduces the occurrence of vibration due to the uncut portions of the work material interfering with the grooves during cutting. Therefore, the cutting force can be decreased while reducing the occurrence of vibration due to the uncut portions of the work material interfering with the grooves. Hence, the insert 1 is capable of having excellent cutting performance. Specifically, though the clearance angle within the groove 9c is preferably about 1 to 5 degrees greater than the clearance angle within the groove 9a, the present invention is not limited thereto.

The clearance angle within the groove means the clearance angle at the surface recessed inwardly of the insert 1 from the main cutting edge 6a. Specifically, it indicates the clearance angles in the peripheries of the positions where auxiliary lines L of the grooves 9a, 9b and 9c are drawn in FIG. 1. These auxiliary lines L are the lines passing through the upper parts of these grooves and the lower parts of these grooves at the positions recessed most inwardly of the insert 1 from the main cutting edge 6a. The clearance angles mean the angles indicating the inclinations with respect to the surface of a work material 120 in the periphery of the positions where the auxiliary lines L of the grooves 9a, 9b and 9c are drawn as shown in FIGS. 4(a) to 4(c).

Figure 4:
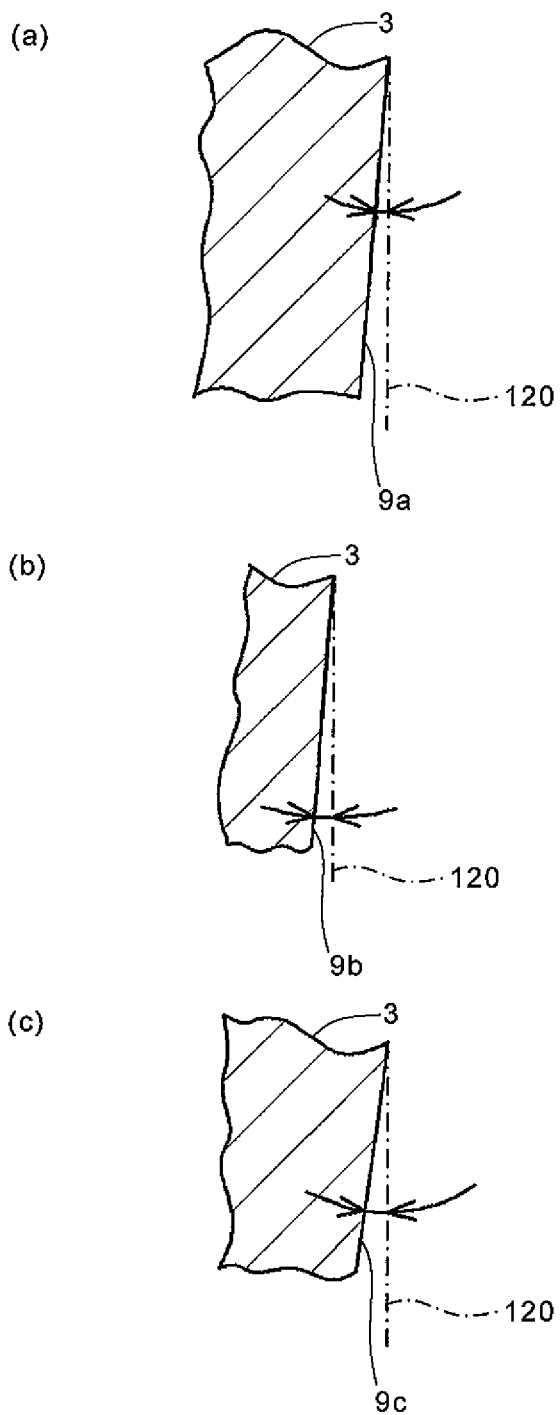
FIG. 4(a) is a diagram showing the broken surface taken along the line I-I in FIG. 2.
FIG. 4(b) is a diagram showing the broken surface taken along the line II-II in FIG. 2.
FIG. 4(c) is a diagram showing the broken surface taken along the line III-III in FIG. 2.

Particularly, in the present preferred embodiment, the grooves 9a, 9b and 9c as being a plurality of grooves are formed so that the clearance angles within these grooves sequentially increase from the groove 9a nearest to the high-positioned corner cutting edge 5a toward the groove 9c nearest to the low-positioned corner portion 5b (refer to FIG. 4). This enables reduction of the occurrence of vibration due to the uncut portion of the work material interfering with these grooves.

As shown in FIG. 3, the side surface 4 in the longitudinal direction of the insert 1 comprises a first flank 11 connecting to a first flat cutting edge 7, a second flank 12 connecting to the tilted cutting edge 8, and a third flank 13 connecting to a second flat cutting edge 10. "a", "b" and "c" satisfy the relationship of a<b<c, wherein "a" represents the clearance angle within the groove 9a formed at the first flank 11, "b" represents the clearance angle within the groove 9b formed at the second flank 12, and "c" represents the clearance angle within the groove 9c formed at the third flank 13. By arranging so that these "a", "b" and "c" satisfy this specific relationship, it is capable of reducing the occurrence of vibration due to the uncut portions of the work material interfering with the grooves during cutting.

The first flank 11 and the third flank 13 comprise clamping surfaces on substantially the same flat surface, respectively. Accordingly, when the insert 1 is mounted on the holder 60, the first flank 11 and the third flank 13 function as a stabilizing surface for being in contact with the holder 60, so that the clamping force against the holder 60 can be enhanced to further reduce the occurrence of vibration during cutting. Although in the present preferred embodiment, the second flank 12 is configured so as to project from the first flank 11 and the third flank 13, the present invention is not limited thereto, and the first flank 11, the second flank 12 and the third flank 13 may be configured at substantially the same clearance angle.

The side surface 4 in the longitudinal direction of the insert 1 comprises cutting edge-side flanks 4a adjacent to the main cutting edge 6a. The clearance angles of the cutting edge-side flanks 4a sequentially increase from the high-positioned corner cutting edge 5a toward the low-positioned corner portion 5b (refer to FIG. 3). Consequently, the clearance angle with the insert 1 mounted on the holder 60 (the actual clearance angle) can be maintained at a proper angle without becoming too large, even under the state that the insert 1 is mounted on the holder 60 so that an axial rake angle is a positive, or the edge of blade corresponds to a core height (a radial rake angle is negative). This ensures the strength of the cutting edge.

The third flank 13 comprises a flat portion 14 having a width gradually increasing from the high-positioned corner cutting edge 5a toward the low-positioned corner portion 5b (refer to FIG. 3). Thus, when the insert 1 is mounted on the holder 60 so that an axial rake angle is a positive, it is capable of reducing the interference between the corner parts of the bottom surface 2 of the insert 1 and the work material.

Other preferred embodiment according to the insert of the invention is next described with reference to the accompanying drawings. In FIG. 5 and FIG. 6 referred to here, the same references have been used as in FIG. 1 to FIG. 4 for similar parts, and the description thereof is omitted.

The difference between the insert of the present preferred embodiment and the insert 1 of the foregoing preferred embodiment is the number of grooves formed, that is, the former has four grooves and the latter has three grooves. Specifically, as shown in FIG. 5 and FIG. 6, an insert 21 of the present preferred embodiment has, on a side surface 4 in each longitudinal direction, grooves 22a, 22b, 22c and 22d as a plurality of grooves extending from the side surface 4 to an upper surface 3 to divide a main cutting edge 6a. Thus, insert 21 has a larger number of the grooves than the insert 1, enabling further decreased cutting force during cutting.

The grooves 22a to 22d are configured so that the clearance angle within the groove 22d nearest to a low-positioned corner portion 5b (i.e. the positive radial rake angle side) is larger than the clearance angle within the groove 22a nearest to a high-positioned corner cutting edge 5a (i.e. the negative radial rake angle side). The side surface 4 in the longitudinal direction of the insert 1 comprises further a first flank 11 connecting to a first flat cutting edge 7, a second flank 12 connecting to the tilted cutting edge 8, and a third flank 13 connecting to a second flat cutting edge 10. "a", "b" and "c" satisfy the relationship of a<b<c, wherein "a" represents the clearance angle within the groove 22a formed at the first flank 11, "b" represents the clearance angle within the groove 22b or 22c formed at the second flank 12, and "c" represents the clearance angle within the groove 22d formed at the third flank 13. Hence, like the foregoing preferred embodiment, the configuration of the present preferred embodiment comprising these four grooves is also capable of retaining the strength of the high-positioned corner cutting edge 5a used for cutting all the times. Furthermore, it is capable of reducing the occurrence of vibration due to the uncut portions of the work material interfering with the grooves during cutting, and also decreasing the cutting force while reducing the occurrence of vibration due to the uncut portions of the work material interfering with the grooves. Hence, the insert 21 is capable of having excellent cutting performance.

Also in the present preferred embodiment, the grooves 22a to 22d are formed so that the clearance angles within these grooves sequentially increase from the groove 22a nearest to the high-positioned corner cutting edge 5a toward the groove 22d nearest to the low-positioned corner portion 5b. This enables reduction of the occurrence of vibration due to the uncut portions of the work material interfering with the grooves.

The grooves 22a to 22d have their respective widths gradually increasing from the upper surface 3 toward a lower surface 2. This enables retention of the strength of the main cutting edge 6a.

The configuration of the insert 21 except for the above mentioned is identical to that described in the forgoing preferred embodiment, and the description thereof is omitted.

Figure 7:
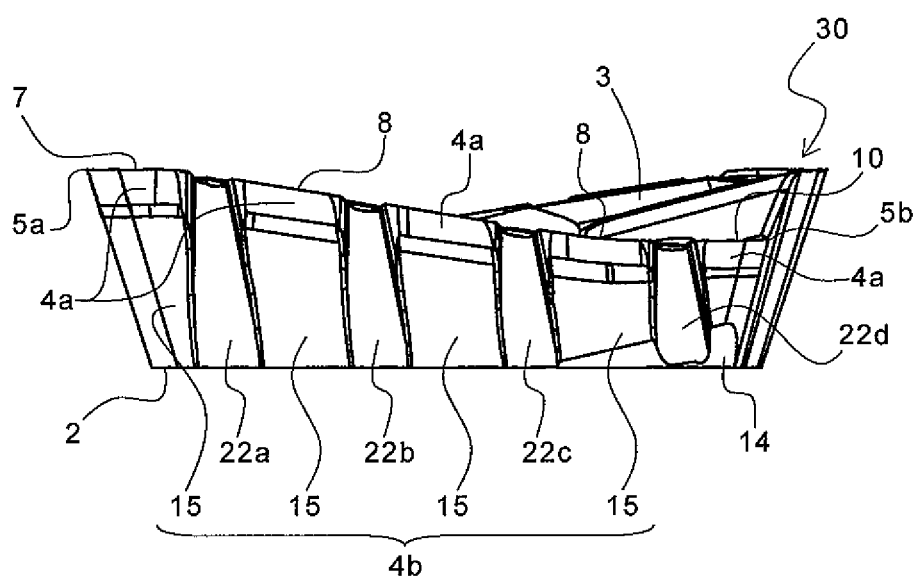
FIG. 7 is a side view showing a cutting insert according to a still other preferred embodiment of the invention.

A still other preferred embodiment according to the insert of the invention is next described with reference to the accompanying drawing. In FIG. 7 referred to here, the same references have been used as in FIG. 1 to FIG. 6 for similar parts, and the description thereof is omitted.

The difference between the insert of the present preferred embodiment and the insert 21 of the foregoing preferred embodiment is the formation of the first flank 11, the second flank 12 and the third flank 13 on the side surface extending from the cutting edge-side flank 4a to the bottom surface 2. That is, the former has none of these flanks, and the latter has all of them. Specifically, as shown in FIG. 7, in an insert 30 of the present preferred embodiment, a side surface 4b extending from a cutting edge-side flank 4a to a bottom surface 2 comprises a flank 15, whose clearance angle is gradually changed from a high-positioned corner cutting edge 5a toward a low-positioned corner portion 5b. This simplifies the process of machining the side surface 4b, thereby achieving cost reduction.

Additionally, the grooves 22a to 22d are configured so that the clearance angle within the groove 22d is greater than the clearance angle within the groove 22a. Hence, like the foregoing preferred embodiment, the configuration of the present preferred embodiment is also capable of retaining the strength of the high-positioned corner cutting edge 5a used for cutting all the times. Furthermore, it is capable of reducing the occurrence of vibration due to the uncut portions of the work material interfering with the grooves during cutting, and also decreasing cutting force while reducing the occurrence of vibration due to the uncut portions of the work material interfering with the grooves. Hence, the insert 30 is capable of having excellent cutting performance.

The configuration of the insert 30 except for the above mentioned is identical to that described in the foregoing preferred embodiment, and the description thereof is omitted.

<Cutting Tool and Cutting Method>

Figure 8:
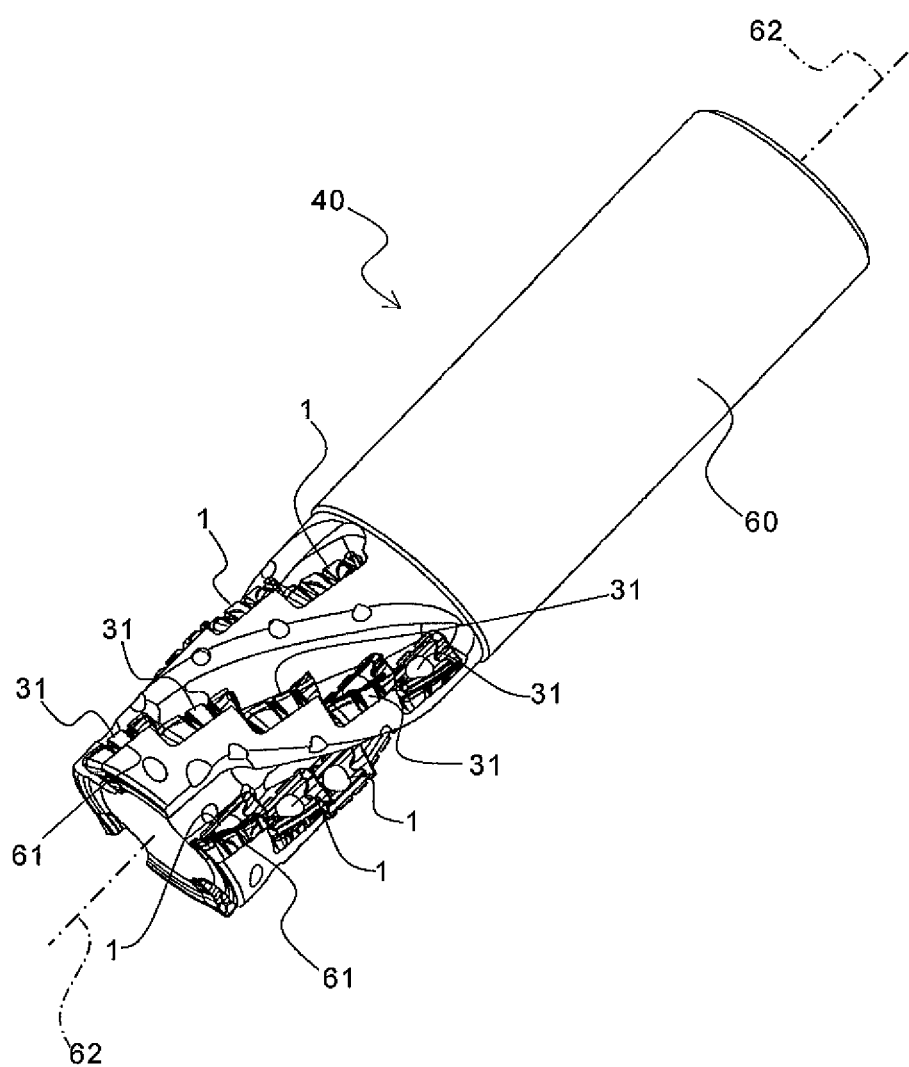
FIG. 8 is a perspective view showing a cutting tool according to a preferred embodiment of the invention.

A preferred embodiment of the cutting tool and the cutting method according to the invention is described below with reference to the accompanying drawings. In FIG. 8 referred to here, the same references have been used as in FIG. 1 to FIG. 7 for similar parts, and the description thereof is omitted.

As shown in FIG. 8, a cutting tool 40 according to the present preferred embodiment is an end mill comprising the insert 1, a insert 31 and a substantially cylindrical holder 60. In the insert 1, the number of grooves is three. The insert 31 has the same configuration as the insert 1 except that the number of grooves is two. The holder 60 comprises a plurality of cutting insert pockets (hereinafter referred to simply as pockets) 61 for removably mounting these inserts 1 and 31 on the tip end outer periphery thereof. These inserts 1 and 31 are arranged so that the axial rake angle when these inserts are mounted on the holder 60 covers a plus portion, and cutting using the inserts 1 and 31 is carried out by rotating the holder 60 around an axis 62 of the holder 60.

Figure 9:
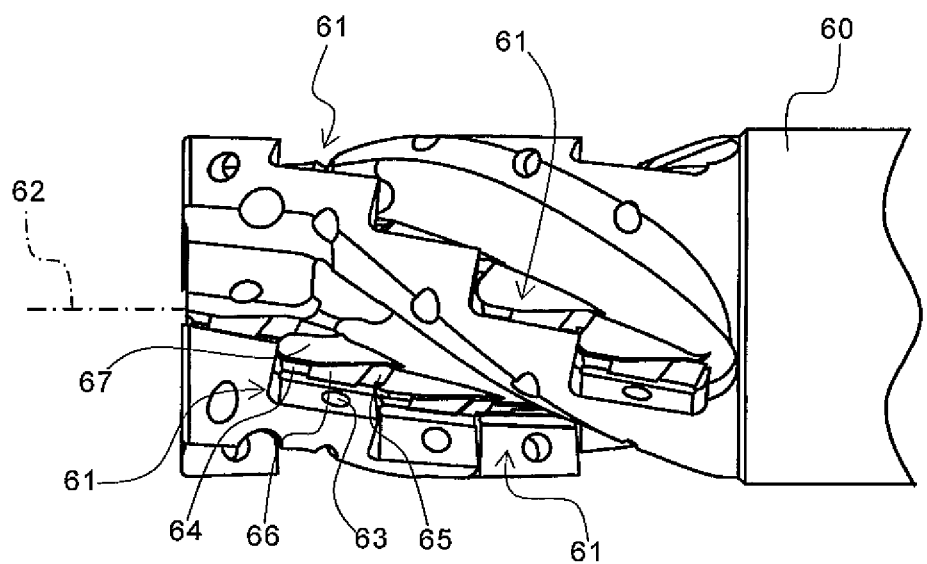
FIG. 9 is a partial enlarged side view showing the neighborhood of the tip end of the holder in FIG. 8.

Specifically, as shown in FIG. 9, the pockets 61 provided on the tip end outer periphery of the holder 60 are arranged at predetermined intervals in the circumferential direction of the holder 60 and arranged in a plurality of rows in the direction of the axis 62 of the holder 60. By inserting a clamp screw into the through-hole 50 of the insert 1 described above, and engaging the tip end of the clamp screw into a screw hole 63 formed at each of the seats of the pockets 61, a plurality of the inserts 1 are removably mounted on the individual pockets 61 provided in the direction of the axis 62.

Since the first flank 11 and the third flank 13 on the side surface 4 of the insert 1 comprise the clamping surfaces located on substantially the same flat surface, lateral abutting surfaces 64 and 65 of the pockets 61 that abut the first flank 11 and the third flank 13 can also be configured on substantially the same flat surface. It is therefore possible to machine the pockets 61 with high accuracy, so that the insert 1 can be mounted with high mounting accuracy and high clamping force, and the occurrence of vibration during cutting can be further reduced.

The second flank 12 on the side surface 4 of the insert 1 is housed in a notch portion 66 formed between the lateral abutting surfaces 64 and 65 of each of the pockets 61, and the cutting edge-side flank 4a of the insert 1 is housed in a release portion 67 formed at the upper portions of the lateral abutting surfaces 64 and 65 of the pocket 61. Thus, when the insert 1 is mounted on the pockets 61, one main cutting edge 6a not used for cutting is brought into the state of being non-contact with the holder 60.

Here, the insert 1 is mounted on the holder 60 so that an axial rake angle increases in a direction away from the tip end of the holder 60. When among the grooves 9a, 9b and 9c of the insert 1, the groove 9a near to the tip end of the holder 60 is represented by a first groove, and the groove 9b (or the groove 9c) near to the rear end than the first groove is represented by a second groove, the clearance angle within the second groove is greater than the clearance angle within the first groove.

The insert 1 is then arranged on the holder 60 so that the radial rake angle of the high-positioned corner cutting edge 5a covers a minus portion and the radial rake angle of the low-positioned corner portion 5b covers a plus portion.

Further, the insert 1 is mounted on the holder 60 so that when the cutting tool 40 is rotated and in contact with a work material, the first flat cutting edge 7 comes in first contact with the work material in the cutting edge. Mounting the insert 1 on the holder 60 under a specific arrangement brings the above-mentioned effect of the insert 1.

On the other hand, a plurality of the inserts 31 are removably mounted on each of the pockets 61 provided in the direction of the axis 62 in the same manner as the insert 1, except that the inserts 31 are mounted so that the cutting edges thereof are located at the uncut portions generated when cutting is carried out by the insert 1 (namely, at the positions corresponding to the grooves 9a, 9b and 9c).

By mounting the inserts 1 and 31 on the individual pockets 61 in the manner described above, the cutting tool 40 having the configuration shown in FIG. 8 can be obtained. The cutting tool 40 is constructed by combining the inserts 1 and 31 having different numbers of grooves, enabling efficient cutting. That is, the insert 1 in which the number of grooves is three has low cutting force than the insert 31 in which the number of grooves is two, but causes more uncut portions than the insert 31. The inserts 31 cut these uncut portions, enabling efficient cutting while reducing the cutting force.

In the cutting using the cutting tool 40, a work material (a metal work to be cut) can be cut into a desired shape by rotating the holder 60 around the axis 62 of the holder 60 and feeding the holder 60 in the side surface direction or the depth direction with respect to the work material, while bringing the rotating cutting edges of the inserts 1 and 31 into contact with the side surface of the work material.

Figure 10:
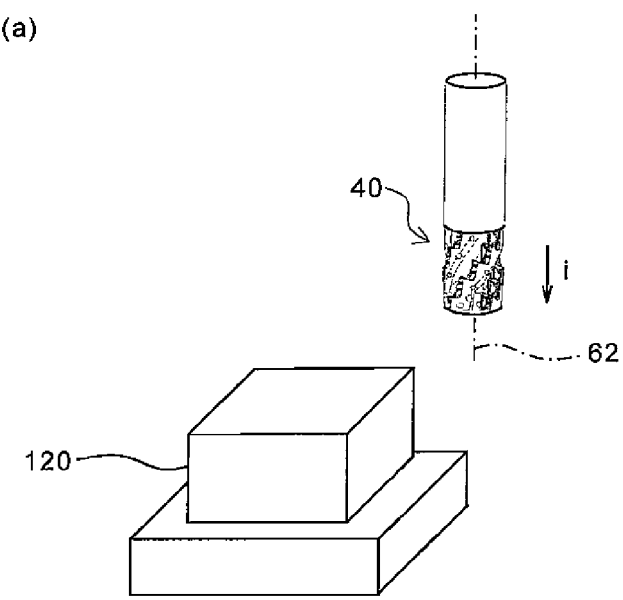
FIGS. 10(a) to (c) are the process diagrams showing a cutting method according to a preferred embodiment of the invention.
Figure 10:
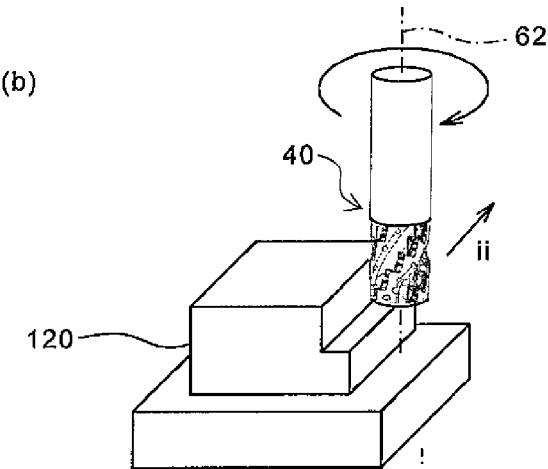
Figure 10:
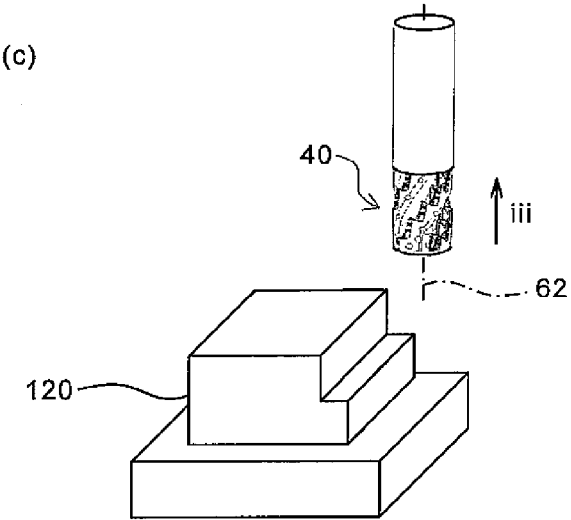

Specifically, the method of cutting a work material using the cutting tool 40 includes bringing, cutting and spacing. That is, in the bringing step, as shown in FIG. 10(a), the cutting tool 40 is relatively brought closer to a work material 120 (in the direction indicated by an arrow "i" in FIG. 10(a)). In the cutting step, as shown in FIG. 10(b), the cutting tool 40 is rotated, and the work material 120 is cut by bringing the cutting edge of the rotating cutting tool 40 into contact with the surface of the work material 120 while feeding the cutting tool 40 in the direction indicated by an arrow "ii". In the spacing step, as shown in FIG. 10(c), the work material 120 and the cutting tool 40 are relatively spaced apart from each other (in the direction indicated by an arrow "iii" in FIG. 10(c)).

Hereat, the inserts 1 and 31 comprise a plurality of predetermined grooves. Further, the clearance angle within the groove nearest to the low-positioned corner portion is greater than the clearance angle within the groove near the high-positioned corner cutting edge, and the clearance angle "a" within the groove formed at the first flank 11, the clearance angle "b" within the groove formed at the second flank 12, and the clearance angle "c" within the groove formed at the third flank 13 satisfy the relationship of a<b<c. Therefore, it is capable of decreasing cutting force while reducing the occurrence of vibration due to the uncut portions of the work material interfering with the grooves during cutting. Consequently, the cutting tool 40 in which these inserts 1 and 31 are arranged so that the axial rake angle of the high-positioned corner cutting edge covers the minus portion and the axial rake angle of the low-positioned corner portion covers the plus portion is capable of decreasing the cutting force while reducing the occurrence of vibration due to the uncut portions of the work material interfering with the grooves, thereby having excellent cutting performance over a long period of time.

In the bringing step, the cutting edge and the work material 120 may be relatively close to each other. For example, the work material 120 may be brought closer to the cutting tool 40. Similarly, in the spacing step, the work material 120 and the cutting tool 40 may be relatively spaced apart from each other. For example, the work material 120 may be spaced apart from the cutting tool 40. When the cutting is continued, the step of bringing the cutting edge of the rotating cutting tool 40 into contact with different portions of the work material 120 is repeated with the cutting tool 40 held in its rotational state. When the cutting edge in use is worn, the unused cutting edge may be used by rotating the inserts 1 and 31 by 180 degrees with respect to the central axis of the through-hole 50.

While the several preferred embodiments according to the invention have been described above, the invention is not limited to the foregoing preferred embodiments, and they are, of course, applicable to those incorporating changes and improvements within the range not departing from the gist of the invention. For example, though the foregoing preferred embodiments have illustrated the case where the inserts comprise the tilted cutting edge 8, the inserts according to the present invention may comprise a cutting edge formed at the ridge between the upper surface and a side surface, and may be formed so that the side surface has a plurality of grooves extending from the side surface to the upper surface to divide the cutting edge, and the clearance angles within these grooves increase from one end of the cutting edge toward the other end of the cutting edge. This enables the achievement of the effect that the cutting force is small and the cutting performance is excellent. Hence, the inserts according to the present invention may or may not have the tilted cutting edge. For example, the cutting edge may be formed in substantially parallel to the lower surface.

Although the inserts in which the number of the grooves is 2 to 4 have been described, the number of grooves in the present invention is not limited thereto, it may be selected arbitrarily in the range of normally from about 2 to 6, preferably 2 to 4, in order to decrease the insert strength deterioration and also decrease cutting force.

Figure 11:
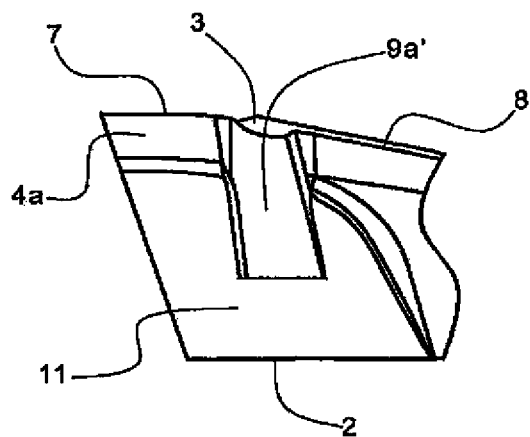
FIG. 11 is a partial enlarged side view showing other example of grooves according to the invention.
Figure 12:
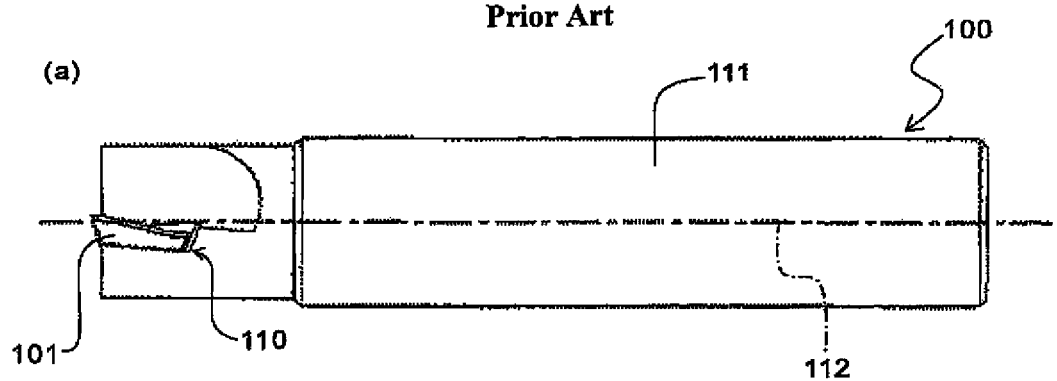
FIG. 12(a) is a side view showing a related art cutting tool.
FIG. 12(b) is an enlarged side view showing a related art cutting insert mounted on the cutting tool in FIG. 12(a).
Figure 12:
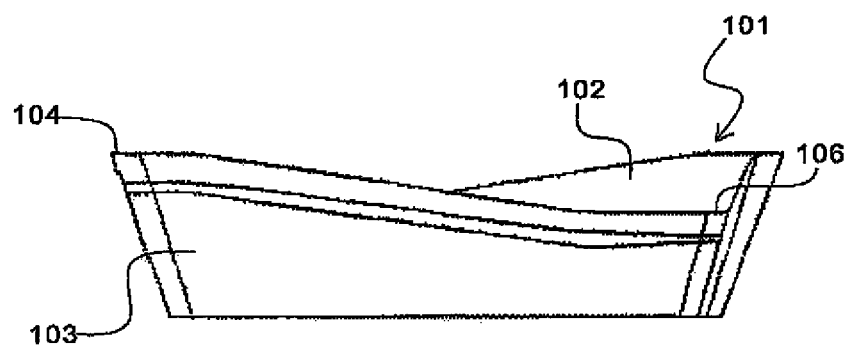

Although the grooves in the foregoing preferred embodiments have substantially the same shape and formed at substantially equal space intervals in the longitudinal direction of the inserts, the grooves may have different shapes and different space intervals depending on the purpose. For example, although in the insert 1 of the preferred embodiment, among the grooves 9a, 9b and 9c, the grooves 9a and 9b extend from the upper surface 3 to the bottom surface 2, the grooves of the present invention may have such a shape as to extend from the side surface 4 to the upper surface 3 to divide the main cutting edge 6a. Therefore, the groove 9a may be formed, for example, in the shape as a groove 9a' shown in FIG. 11.

Although in the foregoing preferred embodiments, the inserts having substantially a parallelogram when viewed from above have been described, the shape of the insert according to the invention is not limited thereto, and it may be in a polygon such as a substantially triangle or a substantially pentagon. As a method of mounting the insert on the holder, there has been described a clamp method in which the insert is screwed into the pockets of the holder. Alternatively, clamp-on method, lever lock method or the like may be employed.

Although in the cutting tool 40, the case of combining the inserts having a different number of grooves has been described, the present invention is not limited thereto, and the cutting tool may be formed by inserts having the same number of grooves.

The invention claimed is:

1. A cutting insert comprising a cutting edge formed at a ridge between an upper surface and a side surface,
    a high-positioned portion located at one end of the ridge; and
    a low-positioned portion located lower in a thickness direction of the insert main body than the high-positioned portion, and located at the other end of the ridge, wherein
    the cutting edge comprises;
        a first flat cutting edge having substantially the same height as the high-positioned portion;
        a second flat cutting edge having substantially the same height as the low-positioned portion; and
        a tilted cutting edge having a height decreasing from the high-positioned portion toward the low-positioned portion, and located between the first flat cutting edge and the second flat cutting edge, wherein
    the side surface has a plurality of grooves extending from the side surface to the upper surface to divide the cutting edge, a first flank connecting to the first flat cutting edge, a second flank connecting to the tilted cutting edge and a third flank connecting to the second flat cutting edge, and
    a clearance angle within each of the grooves increases from one end of the cutting edge toward the other end of the cutting edge, and
    the first flank and the third flank comprise clamping surfaces located on substantially coplanar surfaces, respectively, and the second flank is configured to project from the first flank and the third flank.

2. The cutting insert according to claim 1, wherein among the plurality of grooves, the groove nearest to the one end of the cutting edge has a width increasing from the upper surface toward a lower surface of the cutting insert.

3. A cutting tool with the cutting insert according to claim 1 mounted on a tool holder, wherein
    the cutting insert is mounted on the tool holder so that an axial rake angle increases in a direction away from the tip end of the tool holder, and
    when among the plurality of grooves of the cutting insert, the groove near to the tip end of the tool holder is represented by a first groove and the groove nearer to the rear end than the first groove is represented by a second groove, the clearance angle within the second groove is greater than the clearance angle within the first groove.

4. A cutting insert comprising:
    an insert main body having an upper surface and a plurality of side surfaces;
    a cutting edge located between both ends of a ridge which is between at least one side surface among the side surfaces and the upper surface;
    a high-positioned portion located at one end of the ridge; and
    a low-positioned portion located lower in a thickness direction of the insert main body than the high-positioned portion, and located at the other end of the ridge, wherein
    the cutting edge comprises:
        a first flat cutting edge having substantially the same height as the high-positioned portion;
        a second flat cutting edge having substantially the same height as the low-positioned portion; and
        a tilted cutting edge having a height decreasing from the high-positioned portion toward the low-positioned portion, and located between the first flat cutting edge and the second flat cutting edge, and wherein a plurality of grooves extends from at least one side surface to the upper surface to divide the cutting edge by the grooves, and in the plurality of grooves, the clearance angle within the groove nearest to the low-positioned portion is greater than the clearance angle within the groove nearest to the high-positioned portion, the side surface comprises:
a first flank connecting to the first flat cutting edge;
a second flank connecting to the tilted cutting edge; and
a third flank connecting to the second flat cutting edge, and the first flank and the third flank comprise clamping surfaces located on substantially coplanar surfaces, respectively, and the second flank is configured to project from the first flank and the third flank.

5. The cutting insert according to claim 4, wherein the plurality of grooves are formed so that the clearance angles within the grooves increase from the groove nearest to the high-positioned portion toward the groove nearest to the low-positioned portion.

6. The cutting insert according to claim 4, wherein among the plurality of grooves, at least the groove nearest to the high-positioned portion has a width increasing from the upper surface of the cutting insert toward the lower surface.

7. The cutting insert according to claim 4, wherein the side surface comprises a cutting edge-side flank formed adjacent to the cutting edge, and the cutting edge-side flank having a clearance angle increasing from the high-positioned portion toward the low-positioned portion.

8. A cutting tool comprising the cutting insert according to claim 4 arranged on a tool holder so that the radial rake angle of the high-positioned portion covers a minus portion and the radial rake angle of the low-positioned portion covers a plus portion.

9. A cutting method of cutting a work material by using the cutting tool according to claim 8, comprising:
bringing the cutting tool closer to the work material relatively;
cutting the work material by rotating the cutting tool and bringing the cutting edge of the rotating cutting tool into contact with the surface of the work material; and
spacing apart the work material and the cutting tool relatively.

10. A cutting tool comprising a plurality of the cutting inserts according to claim 4 mounted on the tip end outer periphery of a tool holder, wherein
the cutting inserts are mounted on the tool holder so that the first flat cutting edge in each of the cutting inserts comes in first contact with a work material in the cutting edge during cutting.

11. A cutting insert comprising:
an insert main body having an upper surface and a plurality of side surfaces;
a cutting edge located between both ends of a ridge which is between at least one side surface among the side surfaces and the upper surface;
a high-positioned portion located at one end of the ridge; and a low-positioned portion located lower in a thickness direction of the insert main body than the high-positioned portion, and located at the other end of the ridge, wherein
the cutting edge comprises:
a first flat cutting edge having substantially the same height as the high-positioned portion;
a second flat cutting edge having substantially the same height as the low-positioned portion; and
a tilted cutting edge having a height decreasing from the high-positioned portion toward the low-positioned portion, and located between the first flat cutting edge and the second flat cutting edge, a plurality of grooves extends from at least one side surface to the upper surface to divide the cutting edge by the grooves, the side surface comprises:
a first flank connecting to the first flat cutting edge;
a second flank connecting to the tilted cutting edge; and
a third flank connecting to the second flat cutting edge, and "a", "b" and "c" satisfy the relationship of a<b<c, wherein "a" represents the clearance angle within the groove formed at the first flank, "b" represents the clearance angle within the groove formed at the second flank, and "c" represents the clearance angle within the groove formed at the third flank, and the first flank and the third flank comprise clamping surfaces located on substantially coplanar surfaces, respectively, and the second flank is configured to project from the first flank and the third flank.

12. The cutting insert according to claim 11, wherein among the plurality of grooves, the groove nearest to the high-positioned portion has a width increasing from the upper surface toward the lower surface.

13. The cutting insert according to claim 11, wherein the side surface comprises a cutting edge-side flank formed adjacent to the cutting edge, and the cutting edge-side flank having a clearance angle increasing from the high-positioned portion toward the low-positioned portion.

14. A cutting tool comprising the cutting insert according to claim 11 arranged on a tool holder so that the radial rake angle of the high-positioned portion covers a minus portion and the radial rake angle of the low-positioned portion covers a plus portion.

15. A cutting method of cutting a work material by using the cutting tool according to claim 14, comprising:
bringing the cutting tool closer to the work material relatively;
cutting the work material by rotating the cutting tool and bringing the cutting edge of the rotating cutting tool into contact with the surface of the work material; and
spacing apart the work material and the cutting tool relatively.

16. A cutting tool comprising a plurality of the cutting inserts according to claim 11 mounted on the tip end outer periphery of a tool holder, wherein
the cutting inserts are mounted on the tool holder so that the first flat cutting edge in each of the cutting inserts comes in first contact with a work material in the cutting edge during cutting.

* * * * *